(12) United States Patent
Miyake et al.

(10) Patent No.: US 11,493,025 B2
(45) Date of Patent: Nov. 8, 2022

(54) WIND POWER GENERATION DEVICE

(71) Applicant: HERO POWER TECHNOLOGY CORPORATION, New Taipei (TW)

(72) Inventors: Kunihiro Miyake, Shizuoka (JP); Nariie Omori, Kanagawa (JP)

(73) Assignee: HERO POWER TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 16/483,739

(22) PCT Filed: Feb. 5, 2018

(86) PCT No.: PCT/JP2018/003788
§ 371 (c)(1),
(2) Date: Aug. 5, 2019

(87) PCT Pub. No.: WO2018/143452
PCT Pub. Date: Aug. 9, 2018

(65) Prior Publication Data
US 2020/0018286 A1    Jan. 16, 2020

(30) Foreign Application Priority Data

Feb. 6, 2017   (TW) .................................. 106103818

(51) Int. Cl.
*F03D 9/25*      (2016.01)
*F03D 15/20*     (2016.01)
*F03D 1/04*      (2006.01)
*F03D 1/06*      (2006.01)
*H02K 1/18*      (2006.01)
*H02K 1/2786*    (2022.01)

(52) U.S. Cl.
CPC ................. *F03D 9/25* (2016.05); *F03D 1/04* (2013.01); *F03D 1/0625* (2013.01); *F03D 15/20* (2016.05); *H02K 1/182* (2013.01); *H02K 1/2786* (2013.01); *F05B 2240/221* (2013.01)

(58) Field of Classification Search
CPC ... F03D 9/25; F03D 15/20; F03D 1/04; F03D 1/0625; H02K 1/182; H02K 1/2786
See application file for complete search history.

(56) References Cited

U.S. PATENT DOCUMENTS

2014/0008915 A1*   1/2014 Ribarov ................... F03D 9/25
                                                   290/55

* cited by examiner

*Primary Examiner* — Viet P Nguyen
(74) *Attorney, Agent, or Firm* — Li & Cai Intellectual Property Office (57) ABSTRACT

A wind power generation device includes a rotor assembly and a stator. The rotor assembly includes a rotating member, a first magnetic module, and a second magnetic module the latter two of which are fixed on the rotating member. The rotating member has a column and a spiral blade connected to the column. The first and second magnetic modules are arranged outside the spiral blade and face each other. The rotor assembly defines an annular gap formed around the spiral blade and between the first and second magnetic modules. The stator assembly includes a frame, a positioning member connected to the frame, and an induction module fixed on the positioning member and arranged in the annular gap. The spiral blade can rotate the rotator assembly relative to the stator assembly by wind, so that a region between the first and second magnetic module sweeps over the induction module.

9 Claims, 9 Drawing Sheets

WIND POWER GENERATION DEVICE

CROSS-REFERENCE TO RELATED PATENT APPLICATION

This application claims the benefit of priority to PCT Patent Application No. PCT/JP2018/003788, filed on Feb. 5, 2018. The entire content of the above identified application is incorporated herein by reference.

This PCT Patent Application claims priority from the Taiwan Patent Application No. 106103818, filed Feb. 6, 2017, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electricity generation device, and more particularly to a wind power generation device driven by a spiral blade.

BACKGROUND OF THE DISCLOSURE

A conventional wind power generation device is configured to generate electricity by utilizing the wind to drive a blade. For example, the conventional wind power generation device is provided with a large blade that is used to increase a contact area with the wind. However, electricity generated from the conventional wind power generation device by utilizing the wind to rotate the large blade is extremely limited. Accordingly, how to generate larger electricity on limited wind to drive a wind power generation device is one of the important topics of this field. In addition, the publication number of a related prior art is JP2013-151929.

SUMMARY OF THE DISCLOSURE

In response to the above-referenced technical inadequacies, the present disclosure provides a wind power generation device to effectively improve on the issues associated with conventional wind power generation devices.

In one aspect, the present disclosure provides a wind power generation device, which includes a rotor assembly and a stator assembly arranged outside of the rotor assembly. The rotor assembly includes a rotating member, a first magnetic module, and a second magnetic module. The rotating member has a column, a spiral blade connected to the column, a first carrier fixed to the column, and a second carrier arranged outside of the first carrier. The first magnetic module is fixed to the first carrier and is arranged outside of the spiral blade. The second magnetic module is fixed to the second carrier and is arranged outside of the first magnetic module. The second magnetic module faces toward the first magnetic module along a radial direction of the column. The rotor assembly defines at least one annular gap that is between the first magnetic module and the second first magnetic module and is formed around an outer side of the spiral blade. The stator assembly includes a frame, a positioning member connected to the frame, and an induction module fixed to the positioning member and arranged in the at least one annular gap. When the spiral blade is driven by wind, the rotor assembly is rotated along the column relative to the stator assembly, and a region between the first magnetic module and the second magnetic module sweeps over the induction module, so that the induction module generates an induced current, and Therefore, the wind power generation device of the present disclosure can be provided for effectively utilizing wind through the spiral blade, and the first magnetic module and the second magnetic module can be driven to synchronously rotate for an electricity generation process of the wind power generation device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
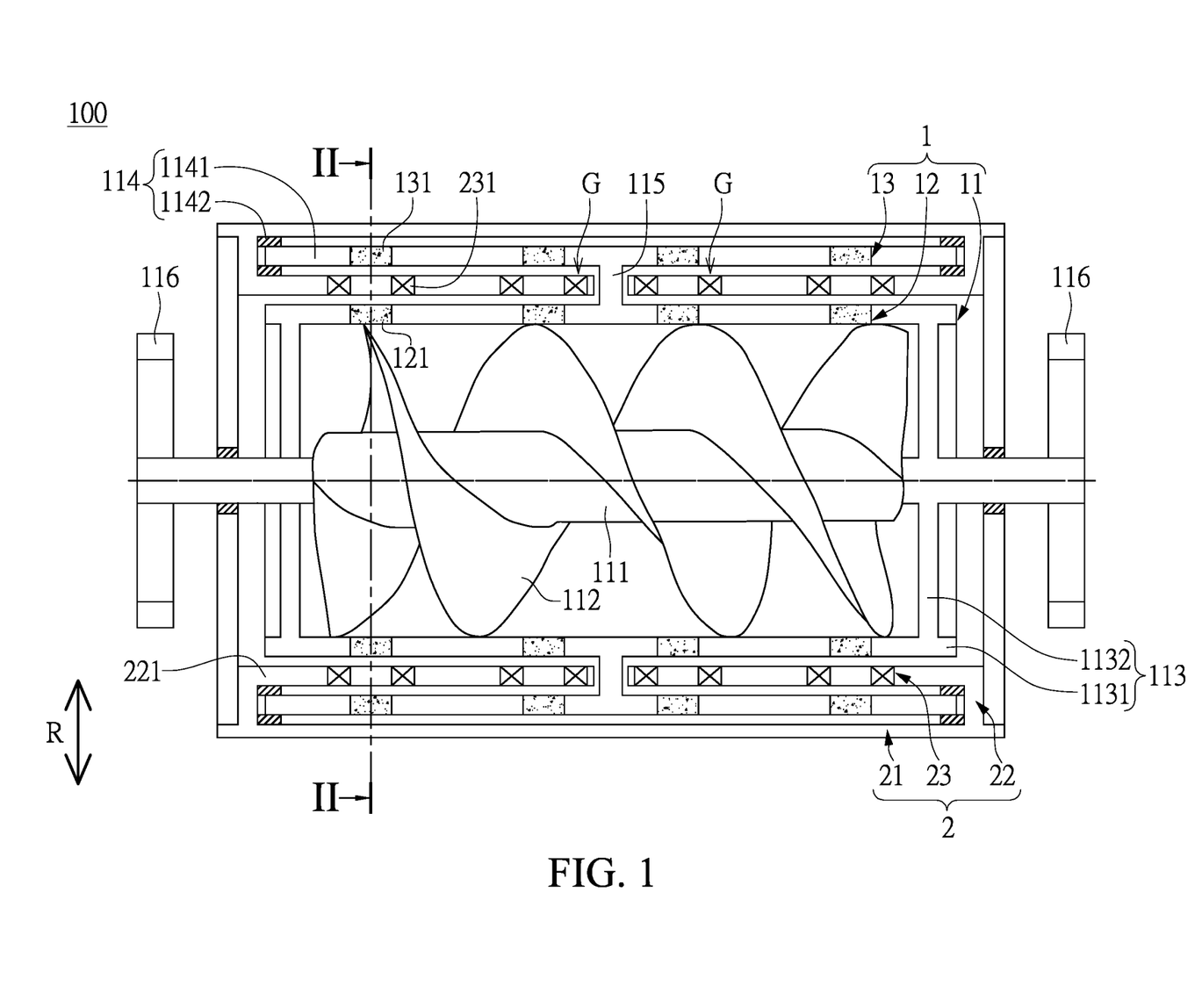
FIG. 1 is a cross-sectional view of a wind power generation device according to a first embodiment of the present disclosure.
Figure 2:
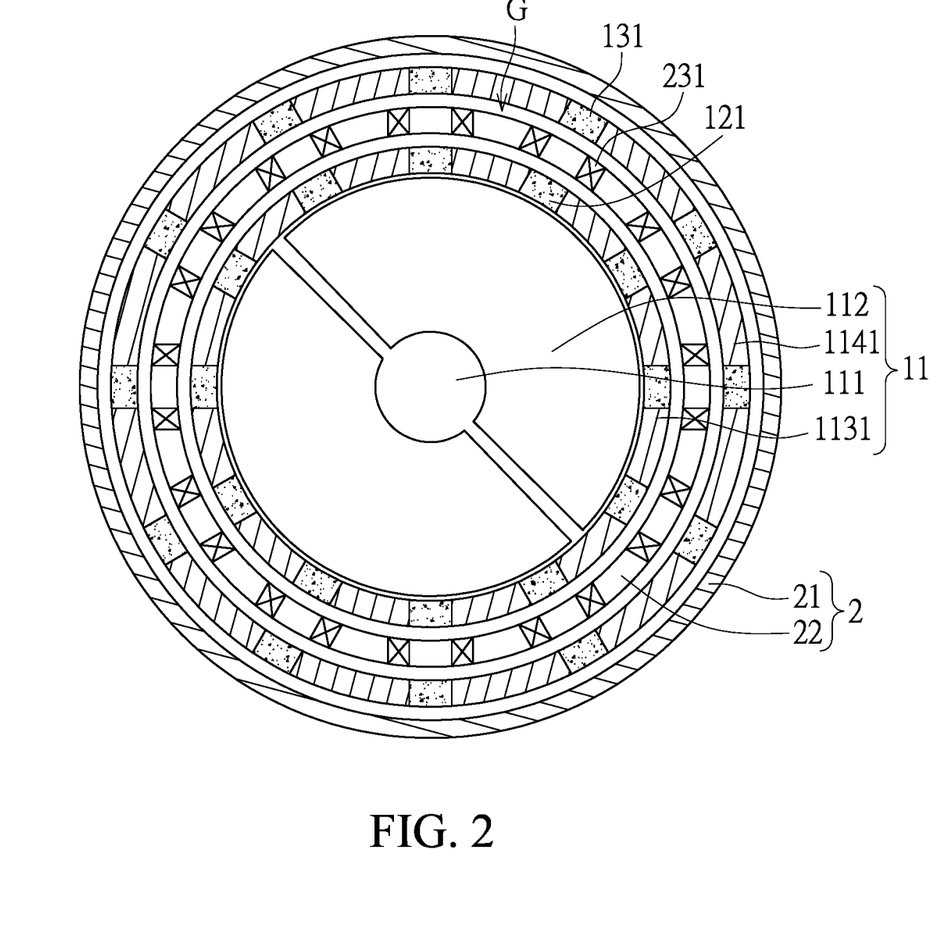
FIG. 2 is a cross-sectional view taken along line II-II of FIG. 1.

Referring to FIG. 1 and FIG. 2, a first embodiment of the present disclosure provides a wind power generation device 100, which includes a rotor assembly 1 and a stator assembly 2 arranged outside of the rotator assembly 1. The rotator assembly 1 includes a rotating member 11, a first magnetic module 12 disposed on the rotating member 11, and a second magnetic module 13 disposed on the rotating member 11 and arranged outside of the first magnetic module 12.

The rotating member 11 has a column 111, a spiral blade 112 connected to an outer surface of the column 111, a first carrier 113 fixed to the column 111, a second carrier 114 arranged outside of the first carrier 113, a connecting member 115 connecting the first carrier 113 and the second carrier 114, and two wind guides 116 respectively fixed to two opposite ends of the column 111.

Moreover, the spiral blade 112 has a length along a central axis of the column 111, and the length is greater than 0.5 pitch of the spiral blade 112 (e.g., 0.8-3.0 pitch is preferable). For example, the length can be 1 pitch, 1.1 pitch, 1.2 pitch, 1.5 pitch, 2.0 pitch, or 2.5 pitch, but the present disclosure is not limited thereto. The spiral blade 112 is disposed on the outer surface of the column 111 by a helix angle that is within a range of 21-55 degrees. In other words, the length of the spiral blade 112 along the central axis of the column 111 is determined by the helix angle and a distance between a peripheral edge of the spiral blade 112 and the central axis of the column 111, but the length of the spiral blade 112 is not limited to the drawings of the present embodiment. It should be noted that the spiral blade 112 excludes any blades similar to a fan blade.

In addition, the column 111 of the rotating member 11 shown in FIG. 1 is formed with one spiral blade 112, but the number of the spiral blade 112 can be adjusted or changed according to practical requirements. For example, in other embodiments of the present disclosure, the rotating member 11 can include at least two spiral blades 11 having substantially the same length and formed on the columns 111.

The first carrier 113 includes an inner hollow cylinder 1131 and a plurality of connecting rods 1132 connecting the inner hollow cylinder 1131 and the column 111. The spiral blade 112 is arranged in the inner hollow cylinder 1131. The connecting rods 1132 are preferably arranged at two opposite sides of the spiral blade 112, and the structure of each of the connecting rods 1132 allows wind to flow into and out of the inner hollow cylinder 1131. The second carrier 114 includes an outer hollow cylinder 1141 and at least two bearings 1142. The inner hollow cylinder 1131 is preferably arranged in the outer hollow cylinder 1141, and the two bearings 1142 are respectively fixed to two opposite ends of the outer hollow cylinder 1141.

Two opposite ends of the connecting member 115 are integrally connected to the inner hollow cylinder 1131 and the outer hollow cylinder 1141, respectively. The connecting member 115 in the present embodiment can be a single annular structure or a plurality of columns, but the present disclosure is not limited thereto. Accordingly, the inner hollow cylinder 1131 and the outer hollow cylinder 1141 can be provided as a single piece through the connecting member 115 so as to be synchronously moved.

Each of the two wind guides 116 is substantially in a hollow shape, thereby allowing wind to flow into the inner hollow cylinder 1131 by passing there-through. The spiral blade 112 and the two wind guides 116 are configured to be driven by wind so as to jointly rotate the rotor assembly 1 along the column 111 in the same direction. For example, the wind guide 116 includes a circular ring portion (not shown) and a plurality of guiding blades (not shown) connected to an outer edge of the circular ring portion and spaced apart from each other, and the wind guide 116 can be driven by utilizing the wind flowing onto the guiding blades.

It should be noted that the rotor assembly 1 defines at least one annular gap G that is between the first magnetic module 12 and the second first magnetic module 13 and is formed around an outer side of the spiral blade 112. The number of the at least one annular gap G in the present embodiment is two. The two annular gaps G are arranged between the first magnetic module 12 and the second first magnetic module 13, and are respectively arranged at two opposite sides of the connecting member 115 (e.g., the two annular gaps G are separated from each other through the connecting member 115). Moreover, the two annular gaps G include a region between the first magnetic module 12 and the second first magnetic module 13.

The first magnetic module 12 is fixed to the first carrier 113 of the rotating member 11, and is arranged outside of the spiral blade 112. The first magnetic module 12 includes a plurality of first magnet blocks 121, and the first magnet blocks 121 are fixed on (e.g., embedded in) the inner hollow cylinder 1131, and are exposed from an outer surface of the inner hollow cylinder 1131, but the present disclosure is not limited thereto.

Specifically, the arrangement of the first magnet blocks 121 on the inner hollow cylinder 1131 can be adjusted according to design requirements. For example, in any cross section of the inner hollow cylinder 1131 perpendicular to the column 111 (as shown in FIG. 2), the inner hollow cylinder 1131 can be formed with at least two of the first magnet blocks 121, and the annular gap G is arranged outside of the first magnet blocks 121.

The second magnetic module 13 is fixed to the second carrier 114 of the rotating member 11, and faces toward the first magnetic module 12 along a radial direction R of the column 111. The second magnetic module 13 includes a plurality of second magnet blocks 131. The second magnet blocks 131 are fixed on the outer hollow cylinder 1141, and are exposed from an inner surface of the outer hollow cylinder 1141. Moreover, the first magnet blocks 121 respectively face toward the second magnet blocks 131 along the radial direction R. A surface of one of the first magnet blocks 121 and a surface of one of the second magnet blocks 131, which face toward each other and are adjacent to each other, respectively have two opposite magnetisms.

Specifically, the arrangement and the number of the second magnet blocks 131 on the outer hollow cylinder 1141 preferably correspond to the arrangement and the number of the arrangement of the first magnet blocks 121 on the inner hollow cylinder 1131, but the present disclosure is not limited thereto. For example, the number of the second magnet blocks 131 of the second magnetic module 13 can be different from that of the first magnet blocks 121 of the first magnetic module 12.

The stator assembly 2 includes a frame 21, and a positioning member 22 connected to the frame 21, an induction module 23 fixed to the positioning member 22 and arranged in the at least one annular gap G The frame 21 in the present embodiment is a hollow cylinder. The two wind guides 116 and the two opposite ends of the column 111 fixed to the two wind guides 116 of the rotor assembly 1 are arranged inside of the frame 21, and the other portion of the rotor assembly 1 is arranged outside of the frame 21.

The positioning member 22 includes at least two L-shaped stands 221. One end of the two L-shaped stands 221 is connected to the frame 21 and arranged at two opposite outer sides of the outer hollow cylinder 1141, and the other end of the two L-shaped stands 221 includes two free ends respectively extending into the two annular gaps G and arranged at two opposite outer sides of the connecting member 115. The two bearings 1142 of the second carrier 114 are arranged between the frame 21 and the positioning member 22. That is to say, an inner corner of each of the two L-shaped stands 221 is provided with one of the two bearings 1142.

The induction module 23 includes a plurality of induced coils 231 fixed to the two L-shaped stands 221 of the positioning member 22. The induced coils 231 respectively correspond in position (e.g., at the same cross section) to the first magnet blocks 121 (or the second magnet blocks 131). Specifically, a cross section of the wind power generation device 100 perpendicular to the column 111 (as shown in FIG. 2) includes at least two of the first magnet blocks 121, at least two of the second magnet blocks 131 facing the at least two of the first magnet blocks 121, and at least two of the induced coils 231.

Accordingly, when the spiral blade 112 (and the two wind guides 116) is driven by wind, the rotor assembly 1 is rotated along the column 111 relative to the stator assembly 2, and a magnetic region between the first magnetic module 12 and the second magnetic module 13 sweeps over the induction module 23 (i.e., the induction module 23 is moved relative to the magnetic region), so that the induction module 23 generates an induced current.

It should be noted that the wind power generation device 100 of the present embodiment is driven only through the spiral blade 112. That is to say, any wind power generation device not being driven by a spiral blade is different from the wind power generation device 100 of the present embodiment.

In summary, the wind power generation device 100 of the present embodiment can be provided for effectively utilizing wind through the spiral blade 112 (and the two wind guides 116), and the first magnetic module 12 and the second magnetic module 13 can be driven to synchronously rotate to facilitate generation of electricity through the wind power generation device 100.

Second Embodiment

Figure 3:
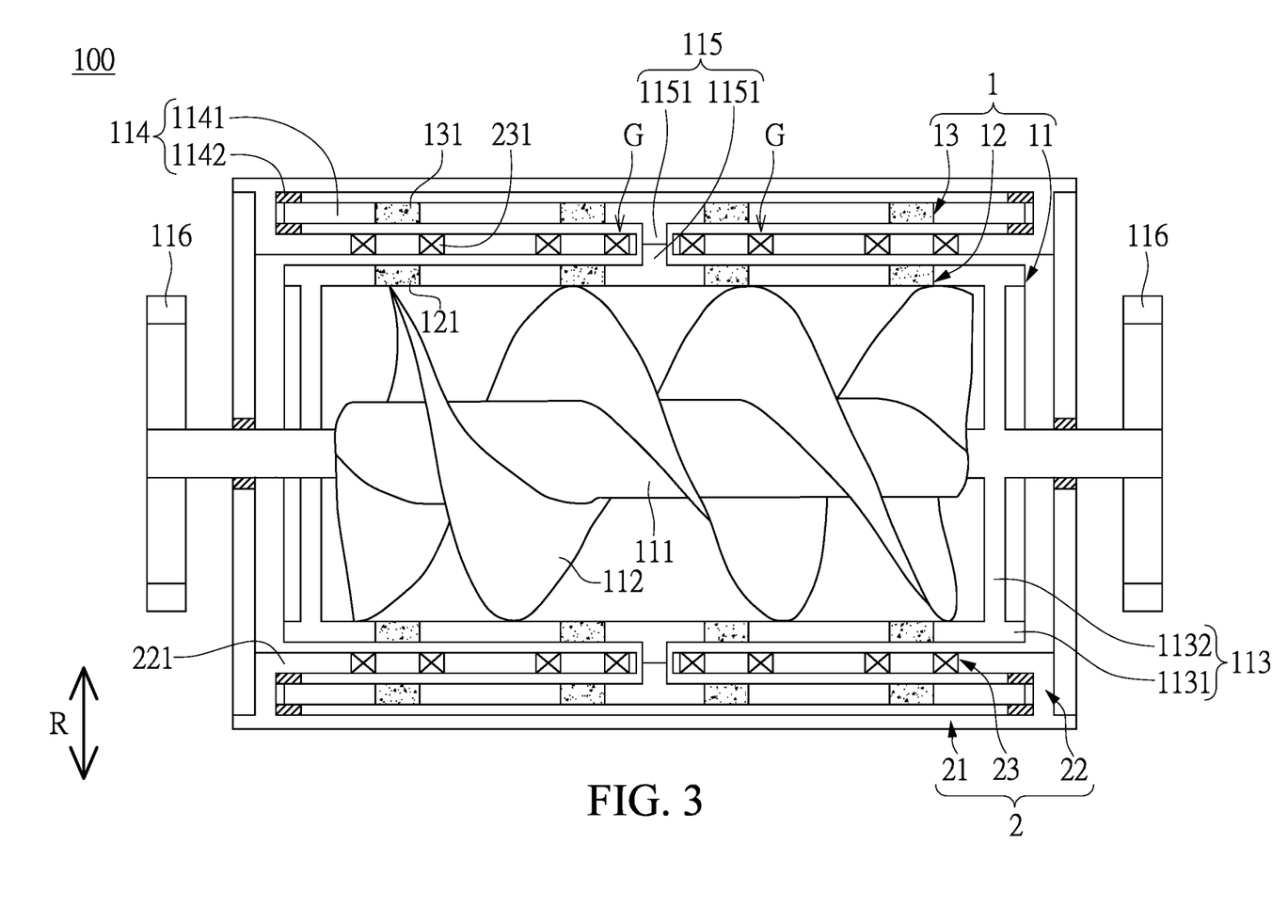
FIG. 3 is a cross-sectional view of a wind power generation device according to a second embodiment of the present disclosure.

Referring to FIG. 3, a second embodiment of the present disclosure is similar to the first embodiment of the present disclosure, so that descriptions of the same components in the first and second embodiments of the present disclosure will be omitted for the sake of brevity, the main difference between the first and second embodiments being the rotating member 11.

Specifically, the connecting member 115 of the rotating member 11 in the present embodiment includes two gears 1151 meshingly engaged with each other, and the two gears 1151 are respectively fixed to the inner hollow cylinder 1131 and the outer hollow cylinder 1141. When the spiral blade 112 drives the first carrier 113 to rotate, the first carrier 113 synchronously rotates the outer hollow cylinder 1141 (i.e., the first carrier 113 and the outer hollow cylinder 1141 are rotated at the same speed) through the cooperation of the two gears 1151.

Third Embodiment

Figure 4:
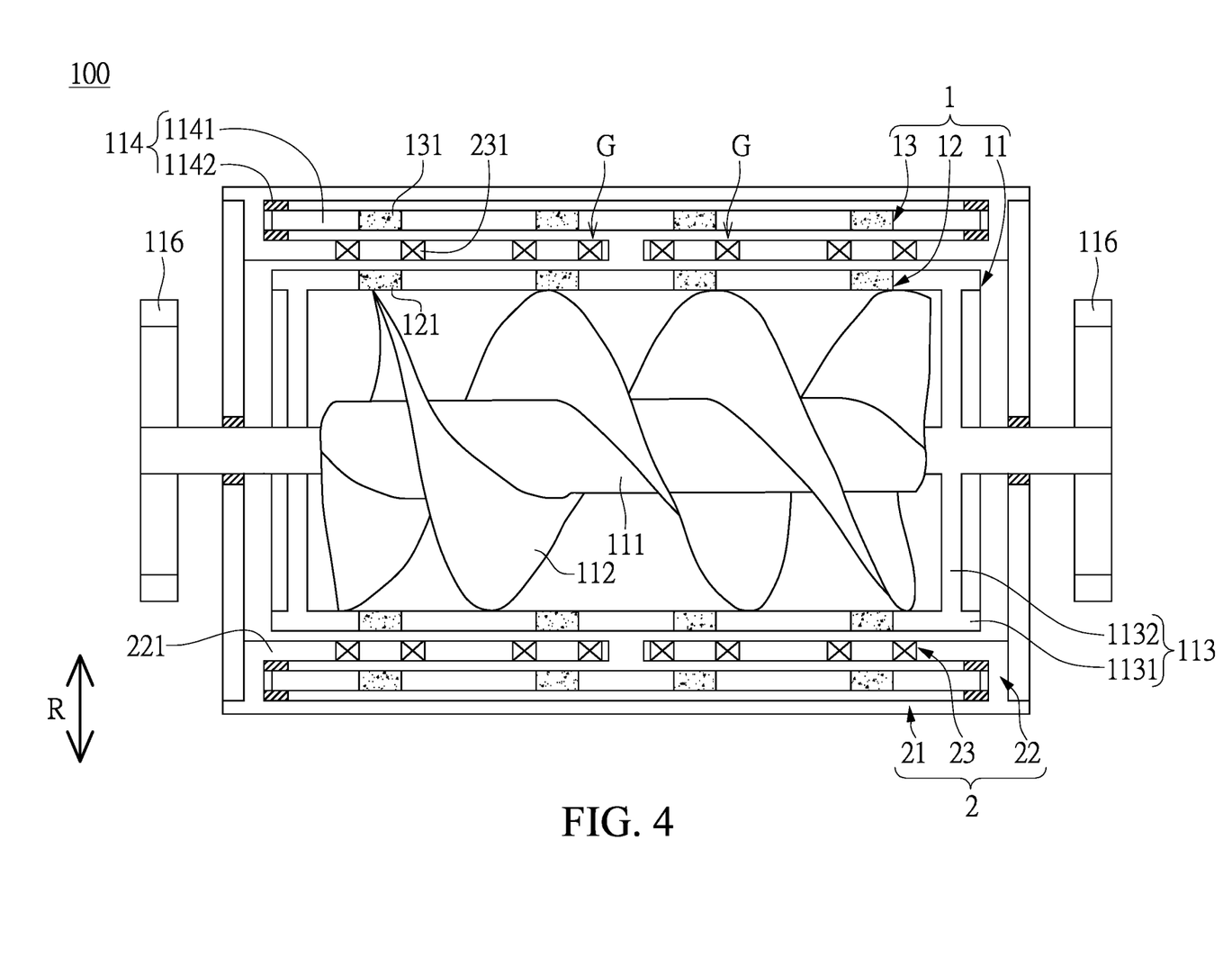
FIG. 4 is a cross-sectional view of a wind power generation device according to a third embodiment of the present disclosure.

Referring to FIG. 4, a third embodiment of the present disclosure is similar to the first embodiment of the present disclosure, so that descriptions of the same components in the first and third embodiments of the present disclosure will be omitted for the sake of brevity, the main difference between the first and third embodiments being the rotating member 11.

Specifically, the rotating member 11 of the present embodiment excludes the connecting member 115, and the inner hollow cylinder 1131 and the outer hollow cylinder 1141 are separated from each other. When the spiral blade 112 drives the first carrier 113 to rotate, the first carrier 113 synchronously rotates the outer hollow cylinder 1141 (i.e., the first carrier 113 and the outer hollow cylinder 1141 are rotated at the same speed) only by using the first magnetic module 12 to magnetically connect to the second magnetic module 13.

Fourth Embodiment

Referring to FIG. 5 to FIG. 8, a fourth embodiment of the present disclosure is similar to the first embodiment of the present disclosure, so that descriptions of the same components in the first and third embodiments of the present disclosure will be omitted for the sake of brevity. The present embodiment provides a wind power generation device 100. The wind power generation device 100 includes a rotor assembly 1, a stator assembly 2 arranged outside of the rotator assembly 1, and a control module 3 electrically coupled to the stator assembly 2 and the rotor assembly 1. The rotator assembly 1 includes a rotating member 11, a first magnetic module 12 disposed on the rotating member 11, and a second magnetic module 13 disposed on the rotating member 11 and arranged outside of the first magnetic module 12.

Figure 5:
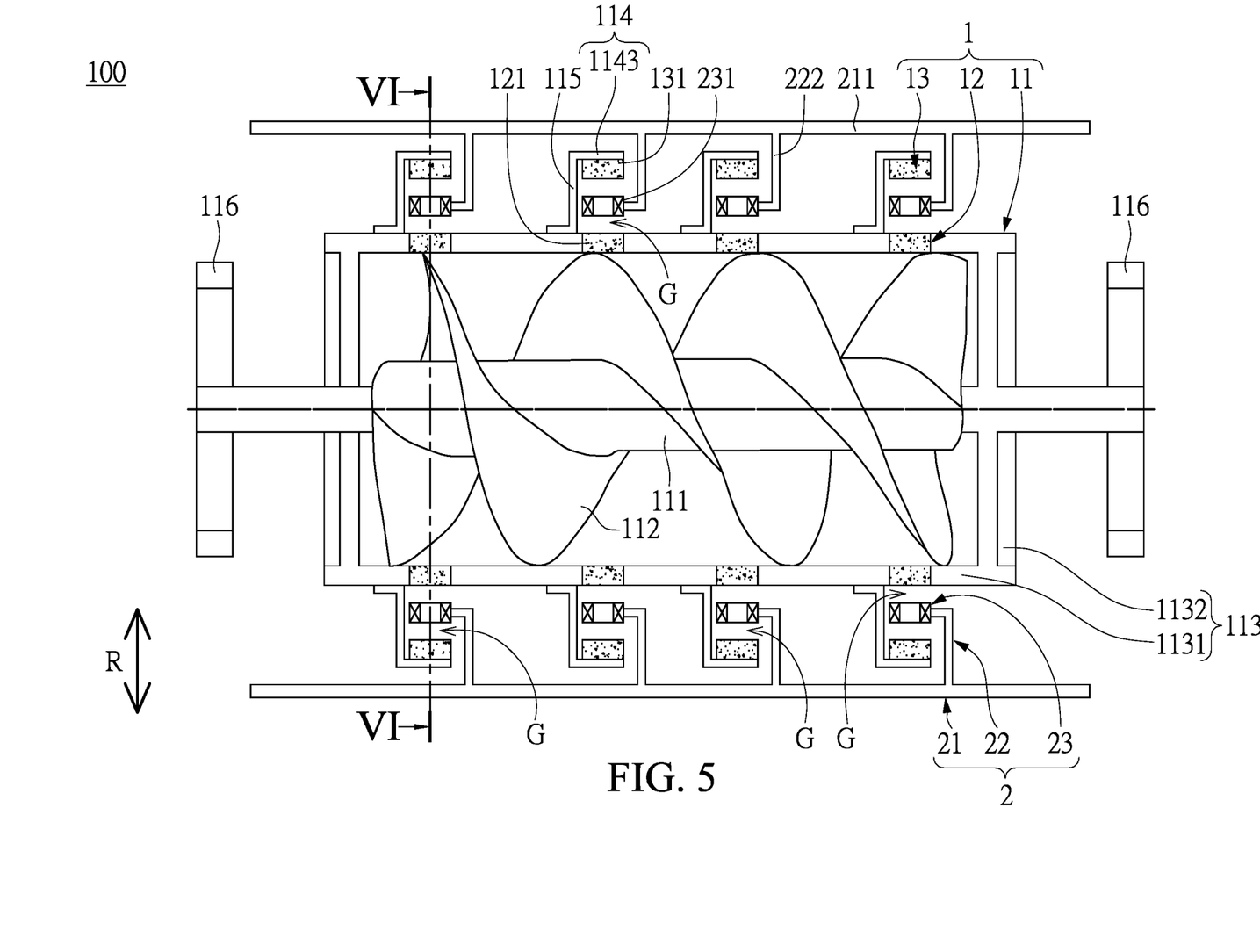
FIG. 5 is a cross-sectional view of a wind power generation device according to a fourth embodiment of the present disclosure.
Figure 6:
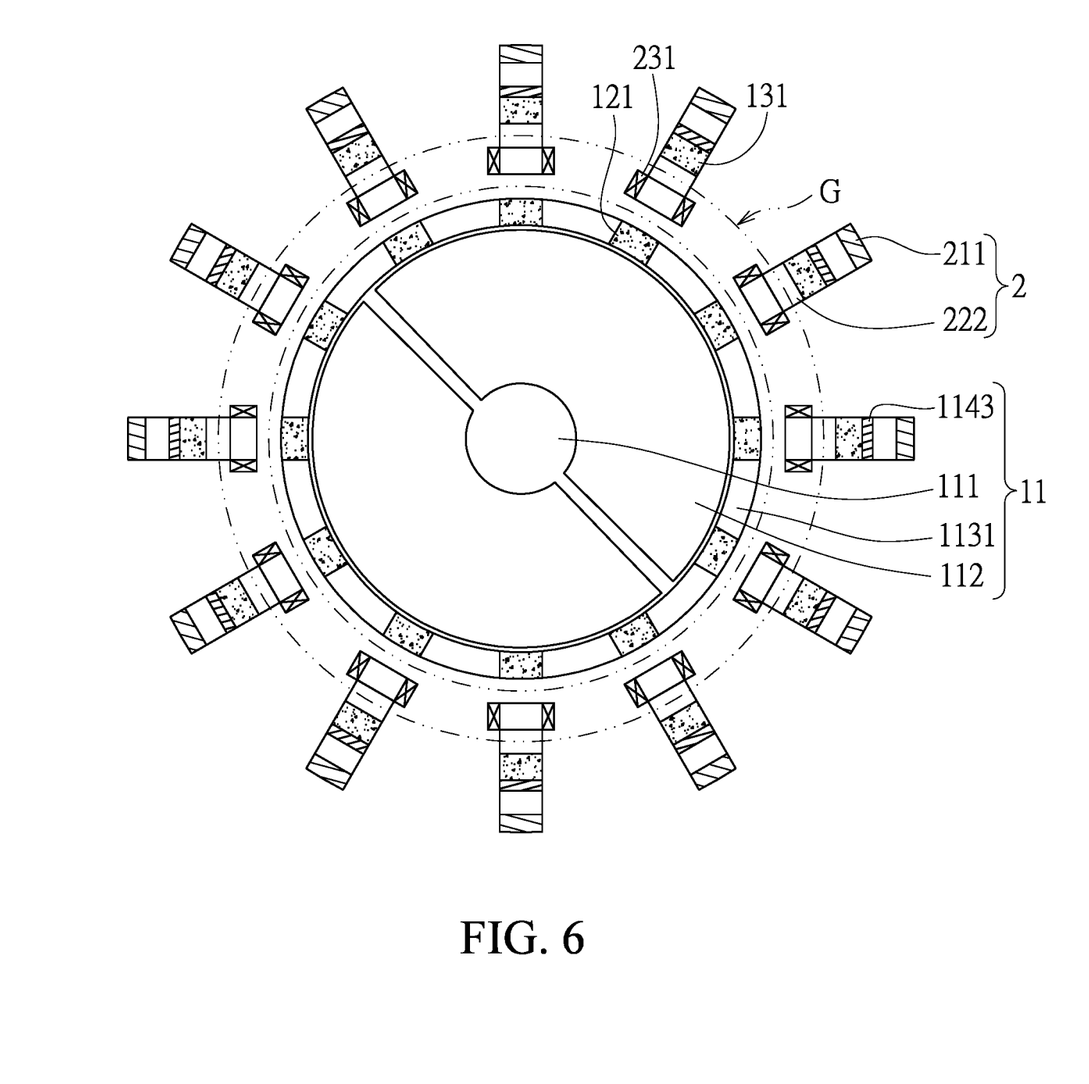
FIG. 6 is a cross-sectional view taken along line VI-VI of FIG. 5.

The rotating member 11 has a column 111, a spiral blade 112 connected to an outer surface of the column 111, a first carrier 113 fixed to the column 111, a second carrier 114 arranged outside of the first carrier 113, a plurality of connecting members 115 connecting the first carrier 113 and the second carrier 114, and two wind guides 116 respectively fixed to two opposite ends of the column 111. The column 111, the spiral blade 112, the first carrier 113, the two wind guides 116, and the first magnetic module 12 in the present embodiment are identical to that of the first embodiment, so that the descriptions of the above components in the present embodiment of the present disclosure will be omitted for the sake of brevity.

The second carrier 114 includes a plurality of positioning sheets 1143. One end of the connecting members 115 is detachably assembled to (e.g., screwed to or engaged with) the inner hollow cylinder 1131, and the other end of the connecting members 115 is fixed to the positioning sheets 1143, respectively. Each of the connecting members 115 and the corresponding positioning sheet 1143 are in cooperation with the inner hollow cylinder 1131 to jointly and surroundingly define a notch, and the notches are oriented in the same direction.

The second magnetic module 13 includes a plurality of second magnet blocks 131 respectively fixed on the positioning sheets 1143, and the first magnet blocks 121 respectively face toward the second magnet blocks 131 along the radial direction R. The rotor assembly 1 defines a plurality of annular gaps G that are between the first magnetic module 12 and the second first magnetic module 13 and are around an outer side of the spiral blade 112.

The stator assembly 2 includes a frame 21, and a positioning member 22 connected to the frame 21, an induction module 23 fixed to the positioning member 22 and arranged in the annular gaps G The frame 21 in the present embodiment includes a plurality of bars 211. The bars 211 are parallel to each other and are arranged around the rotor assembly 1, and each of the bars 211 is parallel to the central axis of the column 111.

The positioning member 22 includes a plurality of supporting rods 222, and the induction module 23 includes a plurality of induced coils 231. One end of the supporting rods 222 is fixed to the bars 211 of the frame 21 (e.g., each of the bars 211 in the present embodiment is fixed with at least two of the supporting rods 222), and the other end of the supporting rods 222 is fixed to the induced coils 231, respectively. Accordingly, when the spiral blade 112 drives the first carrier 113 to rotate, each of the induced coils 231 passes through at least two of the notches. In other words, the notches are in rotation, the induced coils 231 are static, and the induced coils 231 are relatively moved with respect to the notches.

Specifically, a cross section of the wind power generation device 100 perpendicular to the column 111 (as shown in FIG. 6) includes at least two of the first magnet blocks 121, at least two of the second magnet blocks 131 facing the at least two of the first magnet blocks 121, one of the annular gaps G arranged outside the inner hollow cylinder 1131 and arranged inside of the at least two of the second magnet blocks 131, and at least two of the induced coils 231 arranged in the one of the annular gaps G.

Accordingly, when the spiral blade 112 (and the two wind guides 116) is driven by wind, the rotor assembly 1 is rotated along the column 111 relative to the stator assembly 2, and a region between the first magnetic module 12 and the second magnetic module 13 sweeps over the induction module 23, so that the induction module 23 generates an induced current. That is to say, the first magnet block 121 and the second magnet block 131, which face each other and are arranged at a cross section, have a region there-between, and the region sweeps over the induced coil 231 located at the cross section, so that the induced coil 231 generates an induced current.

Figure 7:
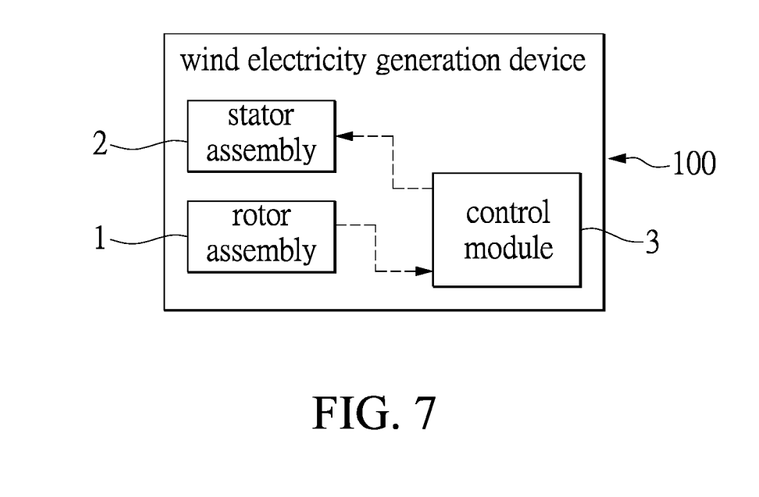
FIG. 7 is a functional block diagram of the wind power generation device according to the fourth embodiment of the present disclosure.
Figure 8:
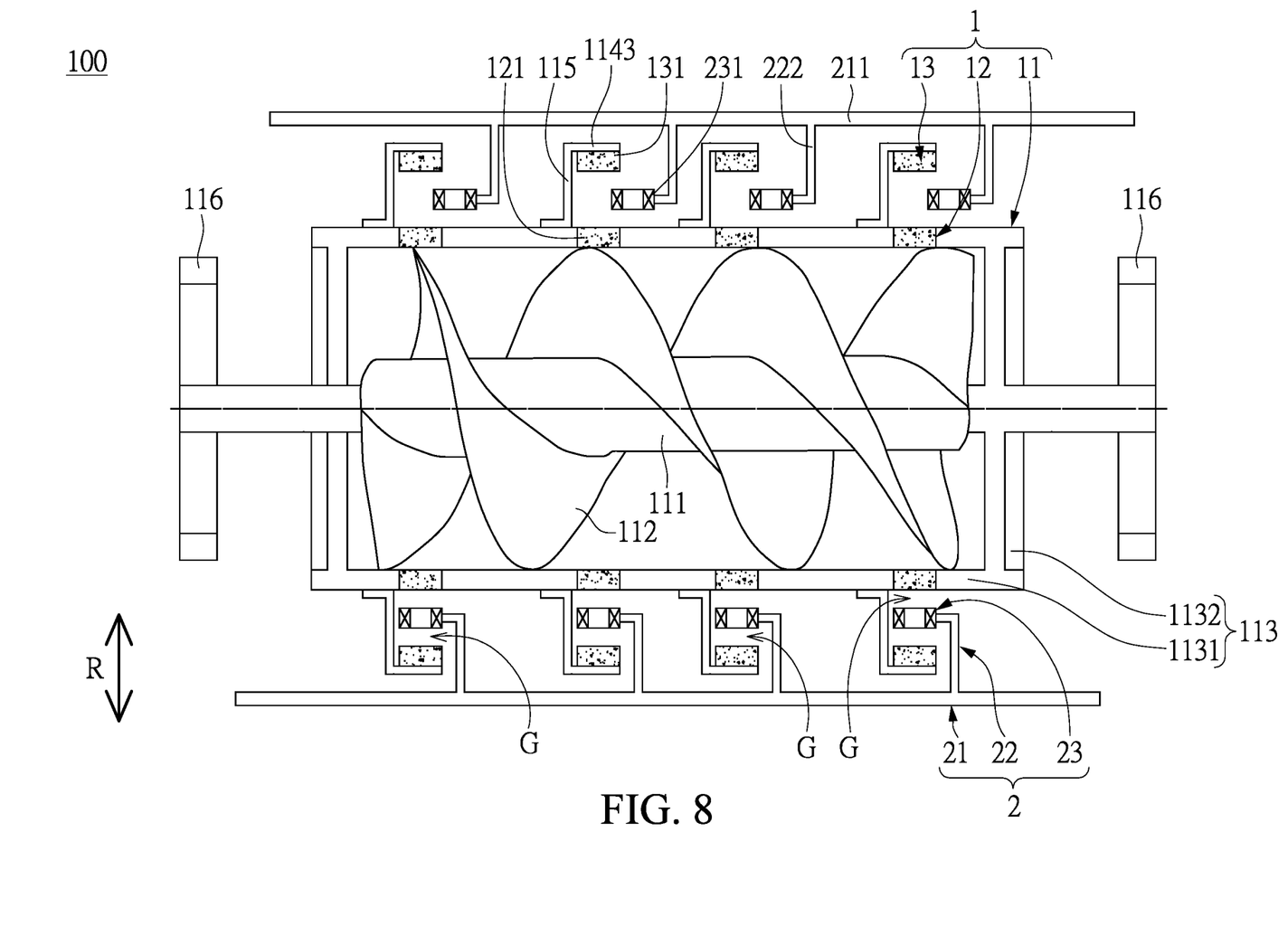
FIG. 8 is a cross-sectional view showing the wind power generation device of FIG. 5 that is in operation.

In addition, when the spiral blade 112 drives the first carrier 113 to rotate, the control module 3 is configured to control the induced coil 231 fixed to at least one of the bars 211 to move away from the corresponding annular gap G (shown in FIG. 8), so that the wind power generation device 100 can generate electricity according to winds of different strengths.

Fifth Embodiment

Figure 9:
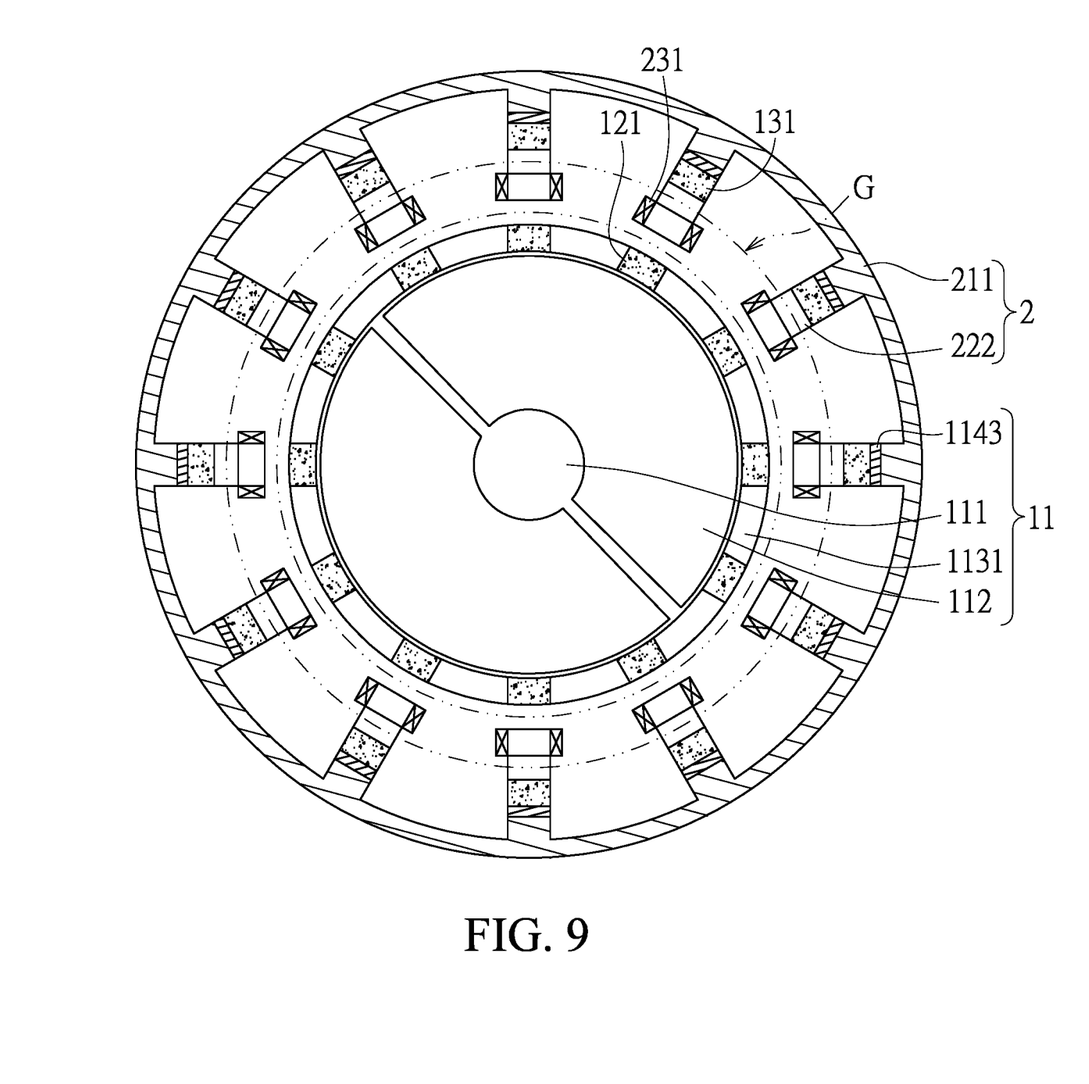
FIG. 9 is a cross-sectional view of a wind power generation device according to a fifth embodiment of the present disclosure.

Referring to FIG. 9, a fifth embodiment of the present disclosure is similar to the fourth embodiment of the present disclosure, so that descriptions of the same components in the fourth and fifth embodiments of the present disclosure will be omitted for the sake of brevity, the main difference between the fourth and fifth embodiments being disclosed as follows. The frame 21 of the present embodiment is a hollow cylinder, and the movement of the frame 21 is not controlled by the control module 3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wind power generation device, comprising:
a rotor assembly including:
   a rotating member having a column, a spiral blade connected to the column, a first carrier fixed to the column, and a second carrier arranged outside of the first carrier;
   a first magnetic module fixed to the first carrier and arranged outside of the spiral blade; and
   a second magnetic module fixed to the second carrier and arranged outside of the first magnetic module, wherein the second magnetic module faces toward the first magnetic module along a radial direction of the column,
wherein the rotor assembly defines at least one annular gap that is between the first magnetic module and the second magnetic module and is formed around an outer side of the spiral blade; and
a stator assembly arranged outside of the rotor assembly and including:
   a frame;
   a positioning member connected to the frame; and
   an induction module fixed to the positioning member and arranged in the at least one annular gap,
wherein when the spiral blade is driven by wind, the rotor assembly is rotated along the column relative to the stator assembly, and a region between the first magnetic module and the second magnetic module sweeps over the induction module, so that the induction module generates an induced current, and
wherein the first carrier includes an inner hollow cylinder and a plurality of connecting rods connected to the inner hollow cylinder, the spiral blade is arranged in the inner hollow cylinder, the first magnetic module includes a plurality of first magnet blocks, and the first magnet blocks are fixed on the inner hollow cylinder and are exposed from an outer surface of the inner hollow cylinder.

2. The wind power generation device according to claim 1, wherein the second carrier includes an outer hollow cylinder and two bearings, the inner hollow cylinder is arranged in the outer hollow cylinder, the second magnetic module includes a plurality of second magnet blocks, the second magnet blocks are fixed on the outer hollow cylinder and are exposed from an inner surface of the outer hollow cylinder, and the first magnet blocks respectively face toward the second magnet blocks along the radial direction, and wherein the two bearings are respectively fixed to two opposite ends of the outer hollow cylinder, and are arranged between the frame and the positioning member.

3. The wind power generation device according to claim 2, wherein the rotating member includes two gears respectively fixed to the inner hollow cylinder and the outer hollow cylinder, and the two gears are meshingly engaged with each other.

4. The wind power generation device according to claim 2, wherein the inner hollow cylinder and the outer hollow cylinder are separated from each other, and when the spiral blade drives the first carrier to rotate, the first carrier synchronously rotates the outer hollow cylinder only by using the first magnetic module to magnetically connect to the second magnetic module.

5. The wind power generation device according to claim 2, wherein the rotating member includes a connecting member, and two opposite ends of the connecting member are integrally connected to the inner hollow cylinder and the outer hollow cylinder, respectively.

6. The wind power generation device according to claim 1, wherein the second carrier includes a plurality of positioning sheets, the rotating member includes a plurality of connecting members, one end of the connecting members is detachably assembled to the inner hollow cylinder, and the other end of the connecting members is fixed to the positioning sheets, respectively, wherein each of the connecting members and the corresponding positioning sheet are in cooperation with the inner hollow cylinder to jointly and surroundingly define a notch, and the notches are oriented in the same direction, and wherein the second magnetic module includes a plurality of second magnet blocks respectively fixed on the positioning sheets, and the first magnet blocks respectively face toward the second magnet blocks along the radial direction.

7. The wind power generation device according to claim 6, wherein the positioning member includes a plurality of supporting rods, the induction module includes a plurality of induced coils, one end of the supporting rods is fixed to the frame, and the other end of the supporting rods is fixed to the induced coils, respectively, and wherein when the spiral blade drives the first carrier to rotate, each of the induced coils passes through at least two of the notches.

8. The wind power generation device according to claim 7, further comprising a control module electrically coupled to the stator assembly and the rotor assembly, wherein the frame includes a plurality of bars, and each of the bars is fixed to at least two of the supporting rods, and wherein when the spiral blade drives the first carrier to rotate, the control module is configured to control the induced coil fixed to at least one of the bars to move away from the at least one annular gap.

9. A wind power generation device, comprising:
a rotor assembly including:
a rotating member having a column, a spiral blade connected to the column, a first carrier fixed to the column, and a second carrier arranged outside of the first carrier;
a first magnetic module fixed to the first carrier and arranged outside of the spiral blade; and
a second magnetic module fixed to the second carrier and arranged outside of the first magnetic module, wherein the second magnetic module faces toward the first magnetic module along a radial direction of the column,
wherein the rotor assembly defines at least one annular gap that is between the first magnetic module and the second magnetic module and is formed around an outer side of the spiral blade; and
a stator assembly arranged outside of the rotor assembly and including:
a frame;
a positioning member connected to the frame; and
an induction module fixed to the positioning member and arranged in the at least one annular gap,
wherein when the spiral blade is driven by wind, the rotor assembly is rotated along the column relative to the stator assembly, and a region between the first magnetic module and the second magnetic module sweeps over the induction module, so that the induction module generates an induced current,
wherein the first carrier includes an inner hollow cylinder and a plurality of connecting rods connected to the inner hollow cylinder, the spiral blade is arranged in the inner hollow cylinder, the first magnetic module includes a plurality of first magnet blocks, and the first magnet blocks are fixed on the inner hollow cylinder and are exposed from an outer surface of the inner hollow cylinder, and
wherein the rotating member includes two wind guides respectively fixed to two opposite ends of the column, and the spiral blade and the two wind guides are configured to be driven by wind so as to jointly rotate the rotor assembly along the column in the same direction.

* * * * *